(12) United States Patent
Kopp

(10) Patent No.: US 7,894,206 B2
(45) Date of Patent: Feb. 22, 2011

(54) MODULAR PROTECTION HOUSING

(75) Inventor: Thomas Kopp, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 747 days.

(21) Appl. No.: 11/624,405

(22) Filed: Jan. 18, 2007

(65) Prior Publication Data

US 2007/0180717 A1 Aug. 9, 2007

Related U.S. Application Data

(60) Provisional application No. 60/771,006, filed on Feb. 7, 2006.

(30) Foreign Application Priority Data

Feb. 7, 2006 (DE) .................. 20 2006 001 904 U
Feb. 7, 2006 (RU) .............................. 2006103560

(51) Int. Cl.
*H01R 12/16* (2006.01)
(52) U.S. Cl. ................... 361/786; 361/752; 361/753; 361/755
(58) Field of Classification Search .......... 280/736–740
See application file for complete search history.

(56) References Cited

U.S. PATENT DOCUMENTS 5,333,422 A * 8/1994 Warren et al. .................. 52/115
6,095,083 A * 8/2000 Rice et al. .................. 118/723 I
6,485,052 B2 * 11/2002 Specht ........................ 280/736
6,940,014 B1 9/2005 Smith et al.
2002/0159928 A1 10/2002 Naka et al.

FOREIGN PATENT DOCUMENTS

| DE | 102 09 732 | 10/2003 |
|----|------------|---------|
| EP | 0 823 834 | 2/1998 |
| GB | 1 184 933 | 3/1970 |
| RU | 2 256 958 | 7/2005 |

\* cited by examiner

*Primary Examiner*—Tuan T Dinh
(74) *Attorney, Agent, or Firm*—Fay Kaplun & Marcin, LLP

(57) ABSTRACT

A modular protection housing with a first housing module and a second housing module is provided. The first housing module comprises a first volume and a first potential rail, while the second housing module comprises a second volume and a second potential rail. In this arrangement the first housing module and the second housing module are coupleable to an operating state in such a way that the first volume and the second volume form a shared volume. In this arrangement the first potential rail and the second potential rail are coupleable such that in the coupled operating state the first potential rail and the second potential rail form a shared potential rail for the overall volume.

16 Claims, 4 Drawing Sheets

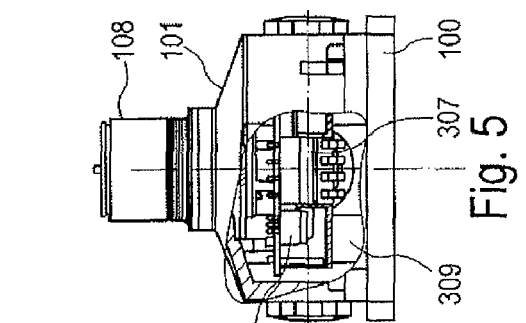
Fig. 5
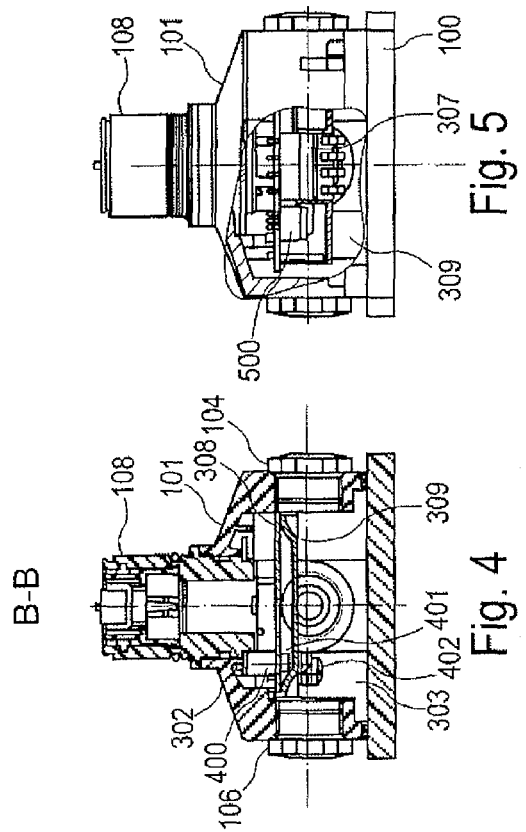
Fig. 3  Fig. 4
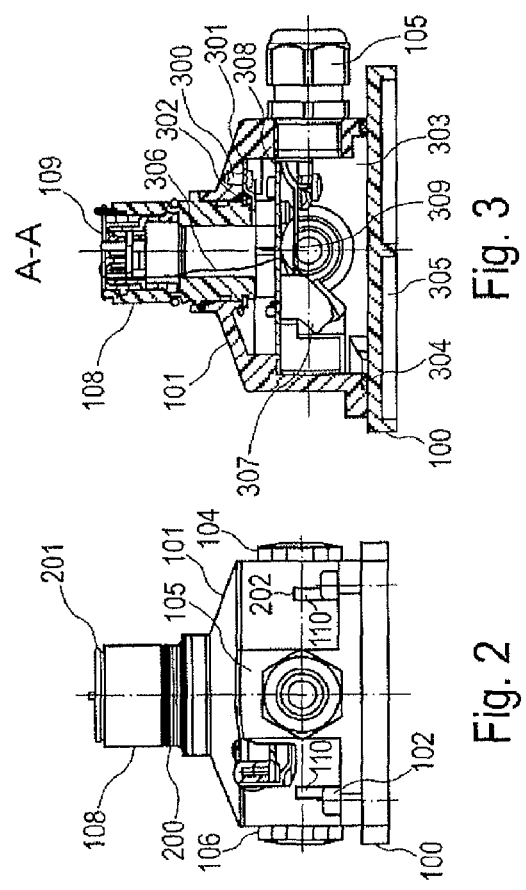
Fig. 1  Fig. 2
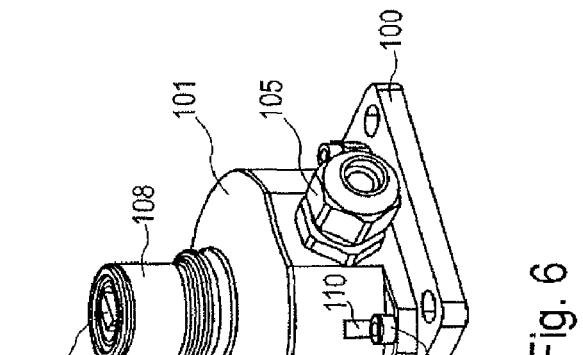
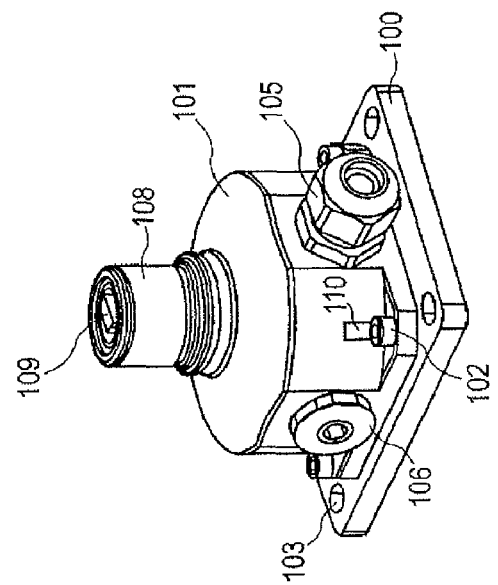
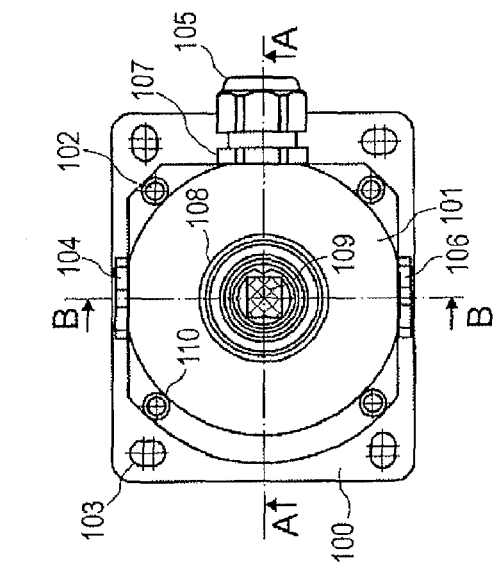
Fig. 6 sealing profile circumferential with groove

MODULAR PROTECTION HOUSING

REFERENCE TO RELATED APPLICATIONS

This application claims the benefit of the filing date of German Utility Model Application Serial No. 20 2006 001 904.9 filed Feb. 7, 2006; Russian patent application Ser. No. 2006103560 filed Feb. 7, 2006; and U.S. Provisional Patent Application Ser. No. 60/771,006 filed Feb. 7, 2006, the disclosure of which applications is hereby incorporated herein by reference.

FIELD OF THE INVENTION

The present invention relates to a housing for a field device. In particular, the present invention relates to a modular protection housing for a field device, and to a field device comprising a modular protection housing.

TECHNOLOGICAL BACKGROUND OF THE INVENTION

Field devices assume a special role in process technology. In the context of this application the term "field devices" refers to any type of measuring devices, for example fill level measuring devices, pressure measuring devices, switching acquisition measuring devices or temperature measuring devices, to name but a few examples. Various physical effects may be utilised for the purpose of acquisition. Measuring data acquisition can take place by means of radar radiation, ultrasound, vibration, guided microwave, time domain reflection (TDR), or capacitive effects. Most of the time, field devices that are measuring devices measure process variables such as for example pressures, fill levels or temperatures, in an industrial environment. These process variables provide information about the state of a material to be processed, and are thus important parameters that may make it possible to optimally control a production process. In the form of actuators, field devices may be used to exert a controlling influence on processes, and if need be to alter process variables.

When using field devices, the measurements or activities are carried out as closely as possible to the material to be processed, so as to obtain the best possible feedback. The materials to be measured can also include materials which, at least in the longer term, can have a negative effect on the field devices. For example, if measuring sensors are used in the processing of corrosive acids there may be a danger that the sensors may become corroded by exposure to the acids.

In applications in industrial plant that have very substantial energy requirements, as may for example be the case in smelting or metallurgical process plants, very considerable electromagnetic radiation may occur as a result of switching large currents. Such electromagnetic radiation may have a negative effect on the operation of measuring sensors.

Likewise, exposure of the electronics of measuring devices to splash water may impede the function of said electronics and reduce their service life.

It is thus common for sensors, and in particular for the associated sensor electronics, to be incorporated in housings that are designed to protect them from exposure to environmental influences.

SUMMARY OF THE INVENTION

According to aspects of the present invention, a modular protection housing for a field device, and a field device comprising a modular protection housing are provided.

According to one aspect of the present invention a modular protection housing is stated that comprises a first housing module and a second housing module. In this arrangement the first housing module comprises a first volume and a first potential rail, and the second housing module comprises a second volume and a second potential rail. In this arrangement the first housing module and the second housing module are coupleable to an operating state in such a way that the first volume and the second volume form a common volume, wherein the first potential rail and the second potential rail are coupleable such that the first potential rail and the second potential rail in the coupled state form a common or shared potential rail. This potential rail is used as a potential rail for the entire common volume created, which volume comprises the first and the second volume.

According to a further aspect of the present invention the modular protection housing may be a modular protection housing for a field device. In this arrangement the field device may be a fill level measuring device, a pressure measuring device or a switching measuring device. If need be the respective electronics to be used may be suitable for evaluating measuring signals by means of radar, ultrasound, capacitive methods, guided microwaves or vibration.

A potential rail or potential equalisation rail may be a conductive element on whose surface an electrical charge is evenly distributed so that there are no voltage differences or potential differences on the potential rail.

It may thus be possible for several volumes, which for themselves alone comprise a potential rail, to be coupled to a common volume, which may be larger, so as to provide a larger accommodation region for any electronic components. The first housing module and the second housing module enclose the respective volumes. In this way an inner region in a volume may be protected from mechanical influences.

A potential rail may provide potential equalisation within the housing. By means of potential equalization the potential rail may prevent different regions within a housing from having a different potential. In other words this means that by means of potential equalization a situation may be prevented in which, within a housing, electrical potential builds up, which electrical potential may lead to spark discharge or arc-over.

Thus, by means of potential equalisation it may be possible to meet explosion protection requirements. The term "explosion protection requirements" refers to specifications relating to devices, in particular to measuring devices, which specifications are a prerequisite for such devices being able to be used in the context of processing potentially explosive materials. In order to ensure that no explosion, and in particular no ignition as a result of spark discharge, occurs in the case of flammable materials or gases, there should be no high currents and no large potential differences in explosion protection regions.

A potential rail that is arranged in a volume, or a potential rail which at least in part surrounds a volume, may prevent propagation of electromagnetic radiation from a region outside the volume to an internal volume region. In this way it may be possible to prevent malfunctions as a result of electromagnetic radiation, for example parasitic induction acting on electronics in the interior of the volume. A potential rail may therefore represent electromagnetic compatibility (EMC) protection.

When a potential rail is arranged in the interior region of a housing the housing may be made insensitive in relation to electromagnetic waves (EMC compatibility). In this arrangement the potential rail may enclose the volume in the manner of a cage.

According to a further exemplary embodiment of the present invention a modular protection housing is stated, wherein the first housing module and the second housing module can be rotatably coupled to each other.

In an overall housing made from rotatable sub-housings, in each case components, in particular printed circuit boards, may be accommodated in the housing halves, and their installation positions can be rotated relative to each other. Space problems during installation or accommodation of a housing may make it necessary for various housing parts to be installed so as to be rotated relative to each other. In spite of the mutual rotation of the housing modules in relation to each other the common potential rail between the housing halves can be coupled, by means of a mechanism that is also rotatable, in such a way that even after rotation a common potential rail is still available.

According to another exemplary embodiment of the present invention at least one of the housing modules comprises a receptacle for an electronic printed circuit board.

Since evaluation circuits are often used in measuring devices, a provided receptacle, in particular a mounting option for an electronic circuit in a housing, may provide stable attachment of the electronic circuit in the housing. It may also be possible to adapt a housing, in particular a sub-housing, to an electronic circuit.

It may thus be possible to save space in that the housing region is adapted only to the electronic circuit used in each instance. Furthermore, by means of defined mounting positions for electronic circuits, allocated installation positions for the electronic circuits can be kept. This may make possible, for example, to take into account special cable guides or other local features for connecting the circuits. For example, in this way it may also be possible to attach to the housing any inputs for an electronic circuit near cable inlets.

According to yet another aspect of the present invention a modular protection housing is created, wherein part of the receptacle for an electronic circuit is designed such that, by means of part of the receptacle, electronic contact can be established to at least one of the two or several potential rails.

For example, a distance sleeve as part of the receptacle may be provided as an electrically conductive component. This distance sleeve can be arranged on a potential equalisation point, earth point or mass point of the circuit. This arrangement may make it possible for the potential rail, in particular for part of the potential rail, to ensure that the circuit used has potential equalisation or an earth. It may also be possible for several circuits to be connected to the potential rail, as a result of which it may be possible to create potential equalisation between the circuits. In this arrangement the circuits can also be separated locally within the housing.

By means of potential equalisation it may be possible to prevent a situation in which voltage potentials build up between the circuits and their components, which voltage potentials can eventually lead to instances of spark discharge and to damage of the components. In this way it may also be possible to achieve explosion-proof installation of circuits in housings.

According to a further aspect of the present invention a modular protection housing is stated, wherein the potential rail is an EMC protection device.

In this arrangement the potential rail may be guided or routed within the housing such that shielding towards the outside can be provided against electromagnetic radiation. In this way it may be possible for components within the housing to be protected from negative effects due to voltage jolts or voltage pulses that can cause electromagnetic radiation.

According to a further aspect of the present invention a modular protection housing is stated, wherein the potential rail, in particular the common potential rail, is designed as a shared potential equalisation device within the common volume.

With a shared potential equalisation device, in particular in the case of larger housings, voltage differences within the housing may be avoided. By avoiding voltage differences it may be possible to prevent instances of spark discharge due to excessive voltages. Likewise, the occurrence of large short-circuit currents may be avoided. By designing the potential rail as a potential equalisation device, an improvement in the explosion protection requirements may also be achieved. If need be, the potential equalisation rail may be arranged in a cage shape within the housing.

According to a still further exemplary embodiment of the present invention a modular protection housing is created wherein part of the first housing module or part of the second housing module has been made from a conductive material. In this way the conductive part of the housing can be integrated in the potential equalisation device or the EMC protection. In other words, the electrically conductive part of the housing itself can form part of the potential rail.

Consequently a potential rail can be composed of several conductive partial elements that are formed differently and that fulfil their functions of EMC protection and potential equalisation. By means of a conductive housing region the housing region enclosed by this conductive material can be almost completely shielded. This can be used for shielding, for example, highly sensitive electronic components such as memory components, e.g. EEPROMs or EPROMs.

According to yet another aspect of the present invention a modular protection housing is stated, wherein the first housing module or the second housing module comprises a plug-in insert, wherein the plug-in insert is designed to separate an intrinsically safe region of the housing volume from a region of the housing volume that is not intrinsically safe.

To this effect an insert can comprise a barrier which can prevent mechanical connection of an intrinsically safe region with a region that is not intrinsically safe. The term "intrinsically safe region" refers to a region in which there are connections which due to suitable measures are adapted to explosion protection criteria. These connections, circuit inputs or contacts may lead to circuits in which there is current limitation. The current limitation in turn may ensure that a maximum permissible short-circuit current in an explosion protection region is not exceeded.

However, within the same housing there may also be connections that are not adapted to the explosion protection provisions. Connections that are not adapted to explosion protection provisions can for example be voltage supply devices of external current sources. An existing barrier, e.g. a partition wall of an insert, may prevent the contacts of the region which is not an explosion protection region from being connected to contacts of the explosion protection region, which would lead to non-compliance with the explosion-protection requirements.

According to yet another aspect of the present invention a modular protection housing is stated, wherein the plug-in insert comprises a captive attachment device. This captive attachment device can for example be a screw that is arranged in a specially provided device, which device prevents the screw from falling out.

The insert can for example be made from a moulded plastic part. The insert can be adapted to the housing shape and the contact positions of electronic printed circuit boards in such a way that it can be inserted into the housing and by means of a snap-on device can snap into a predefined mounting position.

However, the insert may still only be detached manually. In this arrangement it may happen that the insert detaches easily, and for this reason an attachment device may ensure that the insert is firmly seated. If the attachment device is a captive screw, detachment of the attachment device, in particular of the screw, and consequently damage as a result of the attachment device being loosely contained in the housing and creating damage, can be prevented.

The insert may also be adapted in such a way that by way of an aperture in the insert, access to a potential equalisation rail may become possible. The insert may also ensure that an additional chamber is formed, which chamber mechanically separates an electronic circuit from any inlets.

According to a further aspect of the present invention a modular protection housing is stated, wherein the first housing module or the second housing module comprises an external opening.

An external opening makes it possible to access a potential equalisation rail in the interior of a housing also from the outside. The external opening can be implemented by means of a screw which may establish a conductive contact through the housing and to the potential equalisation rail.

According to a further aspect of the present invention a modular protection housing is stated, in which the external opening is designed so that a cable can be inserted through it.

With this design a cable or a line can be inserted, by way of the external opening, from an external region of the housing to the internal region of the housing.

According to yet another aspect of the present invention a modular protection housing is created in which the external opening is designed for connection to the potential rail.

According to a further aspect of the present invention a modular protection housing is stated in which the first housing module and/or the second housing module comprises a closing cover that can be detached from said module. In this arrangement, with the cover detached, the volume of the respective housing module and in particular the internal region of a housing module may be accessible.

The term "cover" also refers to a removable base plate. The cover can also be a screw-on cover. By means of a detachable cover, installation or maintenance tasks on components that are also located in the interior of the housing can be carried out. Thus, in the interior of a housing there can be an electronics insert which if need be is to be deinstalled if a malfunction occurs.

According to yet another aspect of the present invention a seal is arranged between the housing module and the detachable cover. In this arrangement the seal can be arranged either on the cover or on the housing module. The seal can prevent any leak between the outside region of the housing and the inside region of the housing from occurring on the detachable cover. The seal can for example be a sealing ring or a lip seal.

According to a further aspect of the present invention the seal is designed so as to be captive. The seal can be injected in the housing cover or in the housing module, in particular in an edge region. An injected seal can make possible firm seating and thus captive installation of the seal. Because the seal is injected it is, however, also possible to produce seals of any desired shape. In this way the housing modules may not need to have a regular form. By means of sealing rings it may be possible to seal regular, round openings.

Seals, in particular sealing lips, which rest on a housing bottom may prevent dirt particles from entering the interior of the housing, thus causing damage to components to be protected. Thus any acid or humidity that enters the interior of the housing could destroy an electronic circuit located in the interior of the housing.

In concrete terms a fundamental idea of the invention comprises protecting an object to be protected, for example an electronic circuit, from external influences. The external influences can be environmental influences due to dirt, mechanical loads or radiation. Furthermore, a housing may protect an electronic circuit from lightning strikes. By means of plug-in inserts any contact of wires as a result of touching may be prevented.

A counter-groove with a suitable shape as a negative mould may be placed in a seal groove of the housing, and the sealing material can then be injected into a remaining hollow space. After the curing or hardening of the seal, the counter-groove can be pulled off.

Consequently, in order to achieve good results the seal may remain where it has been intended. The seal is captive, as a result of which installation can be carried out more easily and reliably. Reliable sealing function may be maintained even with repeated detachment and closing.

The profile of the seal is triangular with a rounded tip so that the sealing effect arises as a result of a type of line contact, as is the case in an o-ring. Owing to the triangular shape, when it is compressed by the housing cover, the seal can spread in the free space of the housing groove. The sealing effect may be achieved by the restoring action of the elastic material. Due to the free space around the seal the seal may spread in that location without destroying the network structure in the case of a rise in temperature with a resulting volume increase.

Furthermore, a captive arrangement on the housing in the form of a depression may help prevent the housing screws with cylindrical heads from falling from the cover after they have been undone, in particular because an installing technician requires both hands for installation. The depression is formed in such a way that during installation the screws jump over a shoulder which later on serves as a limit stop.

Below, exemplary embodiments of the present invention are described with reference to the figures.

BRIEF DESCRIPTION OF DRAWINGS

FIG. 1 shows a top view of a housing module according to an exemplary embodiment of the present invention.

FIG. 2 shows a lateral view of a housing module according to an exemplary embodiment of the present invention.

FIG. 3 shows a partial section view of a housing module according to an exemplary embodiment of the present invention.

FIG. 4 shows a further partial section view of a housing module according to an exemplary embodiment of the present invention.

FIG. 5 shows a further lateral view according to an exemplary embodiment of the present invention.

FIG. 6 shows a perspective view of a housing module according to an exemplary embodiment of the present invention.

DETAILED DESCRIPTION

Figure 9:
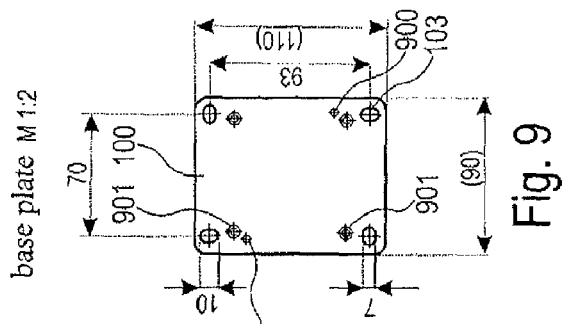
FIG. 9 shows a base plate according to an exemplary embodiment of the present invention.

The illustrations in the figures are diagrammatic and not to scale. In the following description of FIGS. 1 to 15 the same reference characters are used for identical or corresponding elements.

FIG. 1 shows a top view of a housing module according to an exemplary embodiment of the present invention. In this arrangement FIG. 1 shows the base plate 100 with the housing module 101. The housing module 101 is installed on the base plate 100 by means of four screws 102. Like a cover, when the screws 102 are undone, the base plate 100 can be removed from the housing module 101 as a result of which the inner volume which is enclosed by the housing module 101 is released.

The screw connections 102 are for example produced by means of screws with hexagon sockets, which screws are arranged in a captive way on the housing module 101. In order to attach each of the screws 102 in a captive manner a depression 110 is provided on the housing module 101. The depression 110 is matched to the head shape of the screw 102 in such a way that the head of the screw 102 partially comes to rest in the depression 110. The depression 110 extends in parallel direction to the shank of the screw 102. This parallel direction extends in FIG. 1 into the drawing plane so that the screw can freely move in the direction into the drawing plane and out of the drawing plane. The length of the depression 110 is shorter than the length of the screw 102 including the shank of the screw and the head of the screw. In order to prevent the screw 102 from falling from the depression, a limit stop for the screw 102 is provided, which limit stop can prevent the screw 102 from moving out of the drawing plane as soon as the head of the screw 102 abuts the limit stop. Movement of the screw 102 in a direction parallel to the drawing plane can be prevented because the shaft of the screw 102 is guided in a borehole in the housing module 101.

The base plate 100 comprises four elongated holes 103. By means of the four elongated holes 103 the base plate 100 can be installed as a base installation plate 100, for example on a wall or on a structure. The base plate 100 can then easily be separated from the housing module 101 in that the screws 102 are undone. By means of the screws 102, secure wall installation is possible.

The housing module 101 comprises three inlets 104, 105, 106 in a rectangular position in relation to each other. These inlets are for example designed as M20×1.5 screw-in cable glands or as closing screws. A closing screw closes the inlet while a screw-in cable gland makes it possible to feed an object through the opening. For this reason, as a rule, a closing screw is removed before any cables are fed through.

By means of a thread (not shown in FIG. 1) the screw-in cable gland 105 and the closing screws 104 and 106 may easily be removed by turning. By way of the screw-in cable gland 105 the cables can be inserted from an external region into the inner volume of the housing module 101.

In contrast to the closing screws 104 and 106 the screw-in cable gland 105 comprises a distance regulation device 107 by means of which the distance by which the screw-in cable gland 105 projects from the housing module 101 can be adjusted.

The housing module 101 comprises an essentially round contour. Only in the region of the attachment of the cable gland 105, in the region of the closing screws 104, 106, is the circular contour flattened. As a result of this, in the region of the closing screws 104, 106 or of the screw-in cable gland 105 the contour of the device module 101 extends essentially parallel in relation to the contour lines of the base plate 100. The base plate 100 comprises an essentially rectangular form whose edges are rounded.

The external edges of the closing screws 104, 106 are on an imaginary plane with the outer edges of the corresponding base area 100 so that the closing screws 104 and 106 do not protrude beyond the base plate. However, the screw-in cable gland 105 projects beyond the edge of the base plate 100.

The top view of FIG. 1 also shows the cylindrical volume region 108. This part of the housing module 101 is made from conductive material. In the volume enclosed by the cylinder 108 the plug-in contact 109 with an EPROM 109 is accommodated. In this way the electronics 109 are entirely enveloped by a cylindrical housing module 108, as a result of which the electronics 109 and in particular the EPROM 109 are shielded from electromagnetic radiation.

FIG. 2 shows a lateral view of a housing module according to an exemplary embodiment of the present invention. FIG. 2 shows the modular design of the housing module 101, which is made from plastic material. The base plate 100 closes the housing module 101 off towards the bottom. In an enclosed operating mode, in which the base plate 100 is attached to the housing module 101, feed-in into the interior of the housing module 101 can take place by way of the closing screws 104 and 106 or by way of the screw-in cable gland 105.

The housing module 101 with the cylindrical connecting piece 108 is of conical shape. On the cylindrical element 108, ring grooves 200 and 201 are formed. These ring grooves can be used to attach a further housing module and thus to connect a volume expansion. The base plate 100 can be removed by undoing the screws 102 from the housing module 101.

FIG. 2 also shows the depression 110 with the end stop 202 which ensures captive attachment, i.e. attachment that prevents loss, of the screw 102 on the housing module 101.

FIG. 3 shows a partial section view of the housing module of FIG. 1 along the section line A-A according to an exemplary embodiment of the present invention.

FIG. 3 shows a section of the housing module 101. In the housing 101 made from plastic the cylindrical housing extension 108, which is made of conductive material, is arranged. The screw 300 fastens the S-shaped retaining plate 301 to the housing module 101. The S-shaped retaining plate engages a groove of the cylindrical extension 108. In this way the cylindrical extension 108 is secured against rotation within the housing module 101.

A clamping ring 302 engages an annular groove of the cylindrical extension 108 and supports the cylindrical extension on the housing module 101 by establishing contact with an edge of the housing module 101. This prevents the cylindrical extension 108 from detaching itself from the housing module 101.

A clamping ring is a ring that is interrupted by a gap. Consequently a clamping ring comprises two flanks which when pressed apart press the flanks together due to spring force. A snap ring produces a force due to its flanks being pressed together. When the flanks of said snap ring are pressed together, a spring force is generated which attempts to press the flanks apart.

Instead of a clamping ring it is possible to use a snap ring or a wave washer to attach the cylindrical extension.

The housing module 101 encloses the volume 303. The volume 303 may be made accessible by removing the cover 100 or the base plate 100. The sealing lip 304 is provided for tightly closing the cover 100 to the housing module 101. In lateral view the base plate 100 is of rectangular shape. This rectangular shape is interrupted by milled-out regions 305. By removing material from the milled-out regions the weight of the base plate may be reduced.

By way of the cable connection 306 a lower region of the housing module 101 may be connected to electronics 109 in the cylindrical extension 108. In this arrangement the line 306 extends in a volume of the cylindrical housing extension 108. Since the cylindrical housing extension 108 is essentially made of conductive material, the line 306 can essentially be protected from electromagnetic radiation that would otherwise act from outside into the housing interior.

The line 306 leads to the contact terminal 307. The contact terminal 307 is arranged on the printed circuit board 308 in the volume region 303 between the printed circuit board 308 and the base plate 100. The insert 309 has been provided to mechanically decouple the volume region 303 from the base plate 308.

The insert 309 extends so as to be essentially parallel in relation to the printed circuit board 308, and in the region of the screw-in cable gland 105 or the closing screw 104 and 106 is designed so as to have a concave curve in the direction of the printed circuit board. In this way a cable that has been inserted in the screw-in cable gland 105 can be kept separate from the printed circuit board. By means of the insert 309 the volume 303 can be divided into various volume regions. As a result of this the cable connection 307 becomes accessible after the base plate 100 has been opened, whereas the printed circuit board, in particular the electronics on the printed circuit board 308, is/are protected by the insert 309.

FIG. 4 shows a further partial section view of a housing module according to an exemplary embodiment of the present invention. The partial section view shows a section along section line B-B in FIG. 1.

FIG. 4 again shows the insert 309. The printed circuit board 308 is installed below the cylindrical housing extension 108 by means of the connection sleeve or distance sleeve 400, which is made from conductive material, and by means of the screw 401. The screw 401 is screwed to the clamping ring 302 so as to be conductive. In this way a conductive connection can be established between the printed circuit board 308, the distance sleeve 400, the screw 401, the clamping ring 302, and the cylindrical housing extension 108, as a result of which the same electrical potential exists on these components. In this arrangement the screw 401, the distance sleeve 400, the clamping ring 302, and the cylindrical housing 108 can be regarded as a potential rail that extends within the housing module 101.

By way of the screw 402, which leads from the volume 303 through the insert 309 onto the printed circuit board 308, and which is conductively connected to the distance sleeve 400 by way of the printed circuit board 308, the potential or the earth can also be continued into the housing interior 303.

FIG. 5 shows a further lateral view of a housing module according to an exemplary embodiment of the present invention. The insert 309 can separate the terminal connector 307 from the connector 500. For example, the connector 500 can be located in an explosion-proof region, i.e. in a region in which currents are limited to a maximum value, while the multipoint connector 307 can be located in a region that is not explosion proof. By means of separation using the insert 309 the intrinsic safety of the accommodated circuit can be ensured. In this document the term "intrinsic safety" refers to a situation where it is impossible for mechanical contact between components of an explosion-proof region and a region which is not explosion proof to occur.

FIG. 6 shows a perspective view of a housing module according to an exemplary embodiment of the present invention. The perspective view clearly shows the cup-like shape of the housing module 101, as a result of which a volume to accommodate for example a printed circuit board 308 is provided in the interior of the housing module 101. The housing module 101 can be removed from the base plate 100 after the screws 102 have been undone.

Figure 7:
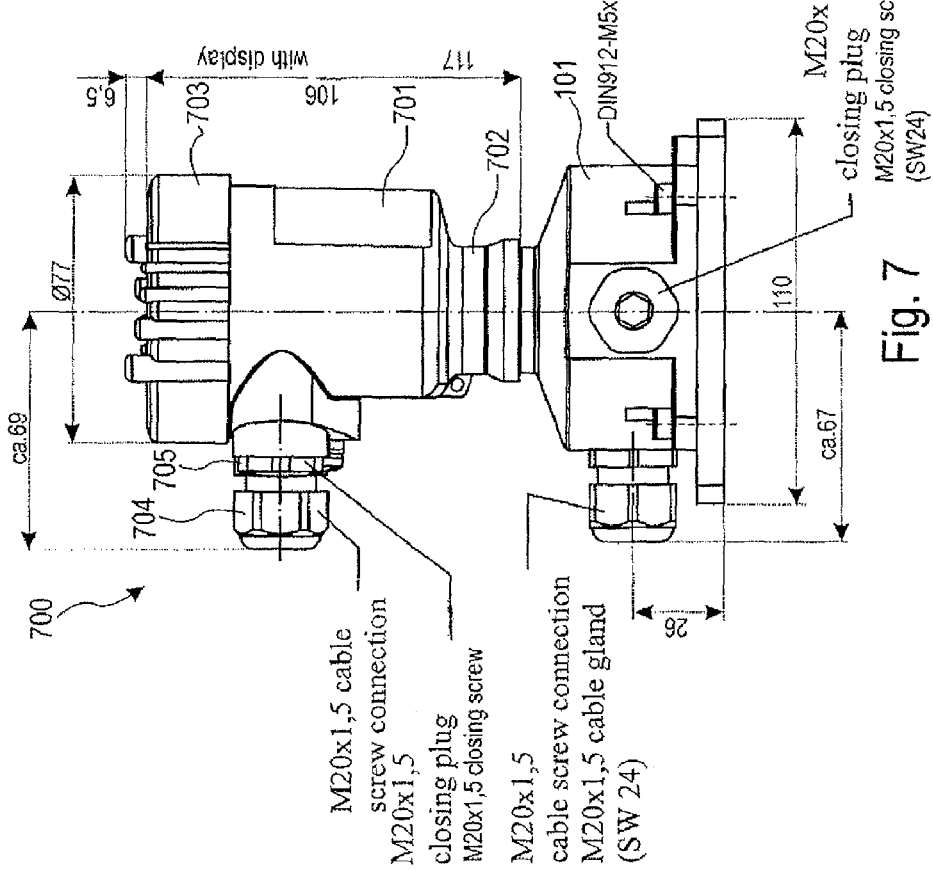
FIG. 7 shows a lateral view of a protection housing according to an exemplary embodiment of the present invention.

FIG. 7 shows a view of a protection housing according to an exemplary embodiment of the present invention. The protection housing 700 comprises a first housing module 101, which is designed as a base 101. Such a base is shown in FIGS. 1 to 6. On the cylindrical extension (not shown in FIG. 7) of the first housing module 101 the second housing module 701 is arranged. The second housing module 701 like the first housing module 101 is essentially cup-shaped. By arranging the first housing module on the second housing module, an hour-glass shape of the protection housing 700 thus results.

By way of the neck 702 the second housing module 701 in a lower tapering region of the housing module 701 is rotatably coupled to the base 101. In this arrangement the lower region of the second housing module 701 accommodates the cylindrical extension 108. In this way the volumes enclosed by the housing base 101 and by the second housing module 701 form a shared volume of the protection housing 700.

On an upper end the second housing module 701 comprises a cover 703. This cover 703 is essentially of circular shape and can be removed from the second housing module 701 by unscrewing it, as a result of which the volume enclosed by the housing module 701 becomes accessible. In a closed state, i.e. when the housing cover 703 is screwed onto the housing module 701, the interior of the second housing module 701 is accessible by way of the screw-in cable gland 704 or the closing screw 705. By way of the screw-in cable gland 704 and the closing screw 705 a connection to the interior of the housing can be established.

Figure 8:
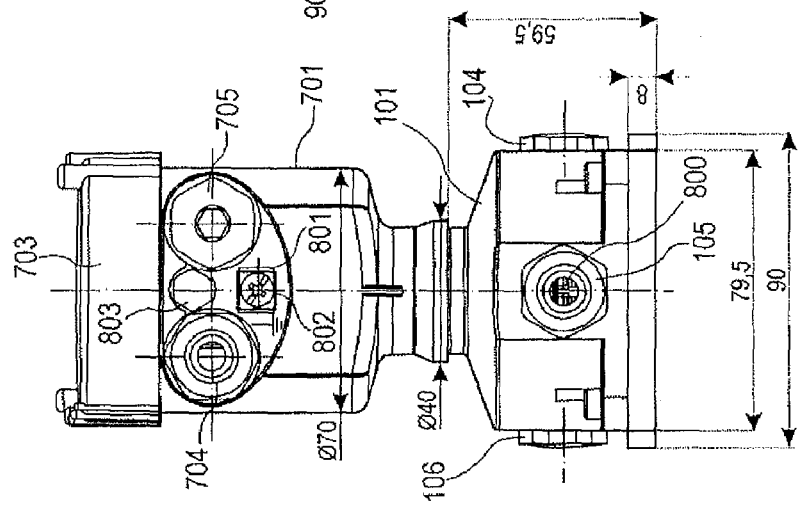
FIG. 8 shows a further view of a protection housing according to an exemplary embodiment of the present invention.

FIG. 8 shows a further view of a protection housing according to an exemplary embodiment of the present invention. While the volume of the base 101 is accessible by way of the closing screws 104 and 106, i.e. a circular aperture 800 in the screw-in cable gland 105 is accessible, the internal volume of the second housing module 701 can be established by way of the closing screw 705 or the screw-in cable gland 704. As a rule, to create a lead-through the closing screw is removed and replaced by a screw-in cable gland.

By way of the external access 801 to the potential rail (the latter is not shown in FIG. 8) a contact from outside the housing 701 to the potential rail within the housing can be established. By means of the screw 802, which establishes contact with the potential rail by way of an opening in the housing, it is for example possible to establish an external earth connection. By way of the aperture 803, after removal of a cover, it is also possible to establish a contact with the potential rail in the interior of the second housing module 701.

FIG. 9 shows a base plate according to an exemplary embodiment of the present invention. The base plate 100 comprises an essentially rectangular shape with rounded edges. By means of the elongated holes 103 the base plate can for example be attached to a wall. The guide holes 900 can be used to determine an installation location of a protection housing. To this effect journals 1400 that have been affixed to the underside of the housing base 101 engage retainers 900. By means of the threads 901 a protection housing can be firmly installed to the base plate 100 by means of the screws 102.

Figure 10:
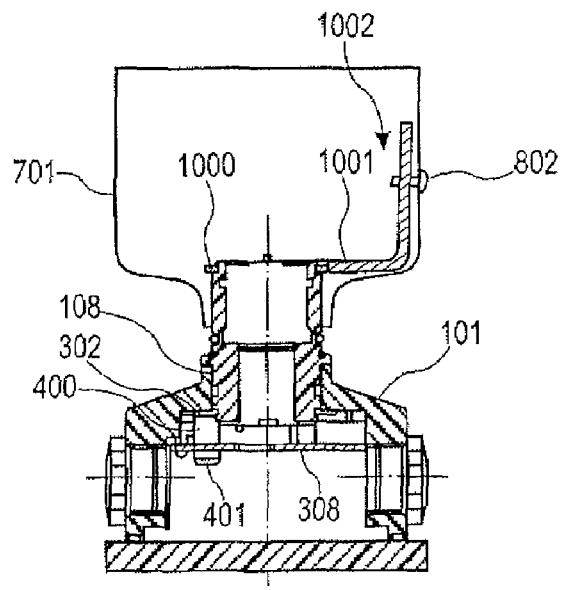
FIG. 10 shows a potential rail in a protection housing according to an exemplary embodiment of the present invention.

FIG. 10 shows a potential rail in a protection housing according to an exemplary embodiment of the present invention. In this arrangement the potential rail extends from the screw 401 by way of the printed circuit board 308 and the distance piece 400 to the clamping ring 302. On the one hand the clamping ring 302 is used to secure the cylindrical housing extension 108 in the base housing 101. At the same time the clamping ring 302 also establishes a conductive connection between the screw 401, the distance element 400, and the cylindrical extension 108. As a result of this the potential rail encloses the individual components such as the screw 401, the distance element 400, the clamping ring 302, and the cylindrical housing extension 108 and thus projects into the interior of the second housing module 701.

The clamping ring 302 is fixed by a spring force which it exerts on the shaft of the cylindrical extension 108.

Within the second housing module 701 the potential rail continues by way of the clamping ring 1000, which is conductively connected to the cylindrical extension 108. The second housing module 701 is rotatably held in relation to the cylindrical extension 108. In this way the cylindrical housing extension 108 is a rotary axis for the second housing module 701 and serves as a rotary bearing.

The clamping ring 101 is rotatably arranged on the cylindrical extension 108 so that even when the second housing module 701 is rotated, a conductive connection between the clamping ring 1000 and the cylindrical housing extension 108 is ensured. The clamping ring 1000 is conductively connected to the potential rail 1001 by means of a screw connection. The potential rail 1001 extends along the inside of the second housing module 701 and by way of the screw 802, through an opening in the housing module 701, establishes an external connection with the inner potential rail 1001.

The two housing modules 701 and 101 thus have a shared overall volume through which a shared potential rail extends. The shared potential rail comprises the screw 401, the distance element 400, the clamping ring 302, the cylindrical housing extension 108, the clamping ring 1000, the potential rail 1001 and the screw lead-through 802. In this way the potential on the screw lead-through 802 can be the same as the potential on the printed circuit board 308, as a result of which it becomes possible to establish potential equalisation, in particular earthing, of the housing. At the same time the shared potential rail 1002 may ensure shielding of the interior of the housing.

Figure 11:
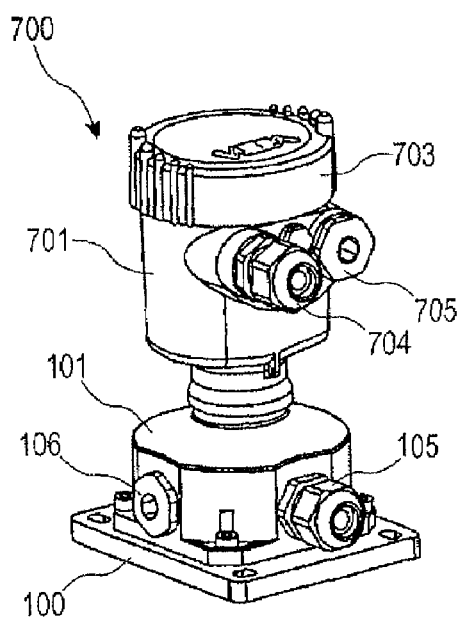
FIG. 11 shows a perspective view of a protection housing according to an exemplary embodiment of the present invention.

FIG. 11 shows a perspective view of a protection housing according to an exemplary embodiment of the present invention. In this arrangement the protection housing 700 comprises the base plate 100, the base housing module 101, the second housing module 701 and the cover 703. The closing screws 705 and 106 make it possible to access the interior of the protection housing as well as the screw-in cable glands 704 and 105.

Figure 12:
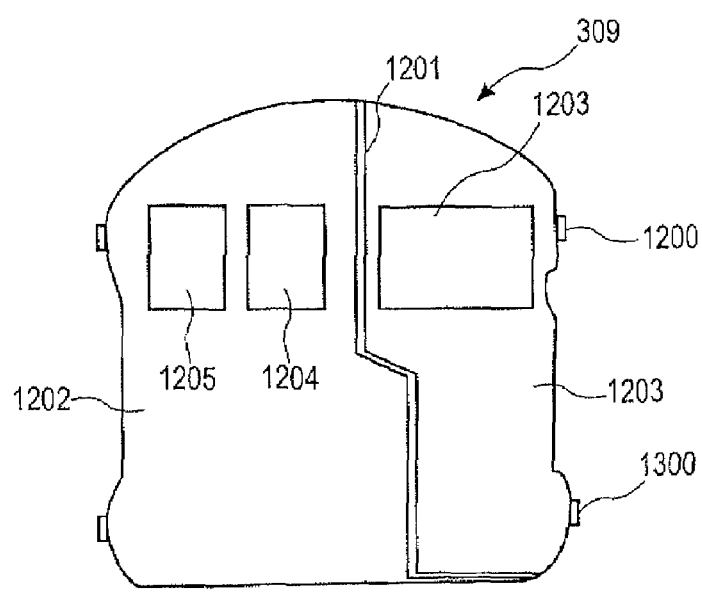
FIG. 12 shows an insert according to an exemplary embodiment of the present invention.

FIG. 12 shows an overview of an insert for a base housing, according to an exemplary embodiment of the present invention. The insert 309 comprises a contour shape that matches the inner form of the base volume 303. By means of the snap-on element or catch element 1200 the insert 309 can be detachably attached in the interior of the base volume 303. For safe attachment the insert 309 can be attached by means of a screw connection in the interior of the housing. In order to simplify installation the screw connection, in particular the screw, can be designed so as to be captive.

With the separation element 1201, i.e. the barrier 1201, in an intermediate wall an explosion-proof region 1202 can be separated from a region 1203 that is not explosion proof. It is thus for example not possible for cables that become detached in the region 1203 that is not explosion proof to be able to establish contact with cables or components in the explosion-proof region 1202. The cables are restrained by the barrier 1201. The insert 309 can be made as a moulded plastic part, wherein the plastic used is selected such that adequate current insulation is provided. The passages 1203, 1204 and 1205 are designed to make it possible for the plug-in connections 1600, 1601 and 1602 to pass through the insert 309.

Figure 13:
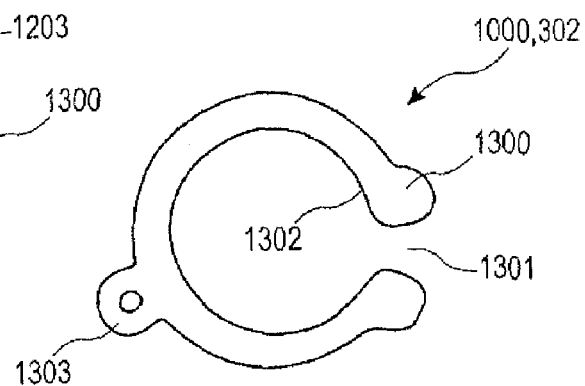
FIG. 13 shows a clamping ring, designed as a potential rail, according to an exemplary embodiment of the present invention.

FIG. 13 shows a clamping ring 1000, 302 according to an exemplary embodiment of the present invention. The clamping ring or snap ring 1000, 302 is essentially ring-like with a C-shape, wherein the ring shape is interrupted, in a region shown on the right hand side in FIG. 13, by the jaws 1300, as a result of which a gap 1301 is formed. By spreading the ring the clamping ring 1000, 302 can be fitted into a groove of the cylindrical housing extension 108. By means of the gripping prongs 1302 essentially firm seating can be ensured. However, in spite of the firm seating, rotation in relation to the cylindrical housing extension 108 may be possible.

The clamping ring 1000, 302 is pressed into the groove of the cylindrical housing extension 108 in such a way that an electrically conductive contact is established between the clamping ring 1000, 302 and the cylindrical housing extension 108. In a region that is essentially opposite the gap 1301, a screw receptacle 1303 is formed, on which for example the screw 401 can be driven in. In this way a further conductive component may be conductively and rotatably connected to the clamping ring 1000, 302.

Figure 14:
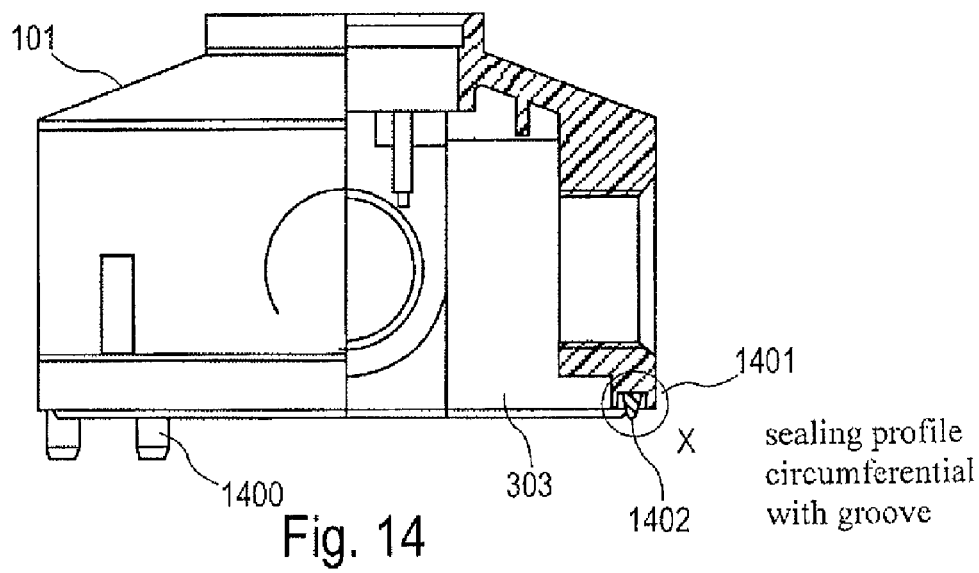
FIG. 14 shows a partial section view of a housing module with a seal according to an exemplary embodiment of the present invention.

FIG. 14 shows a partial section view of a housing module with a seal according to an exemplary embodiment of the present invention. The underside of the base housing 101 comprises journals 1400. With the journals 1400 dimensionally accurate construction on the base plate 100 can take place in that the journals 1400 are fitted into the guide holes 900. For dimensionally accurate construction the journals 1400 engage the boreholes 900 in a positive-locking manner. On a housing edge of the base housing 101 there is a circumferential groove 1401. This groove extends around the underside of the base housing module 101. In this circumferential groove there is a triangular sealing profile 1402.

Figure 15:
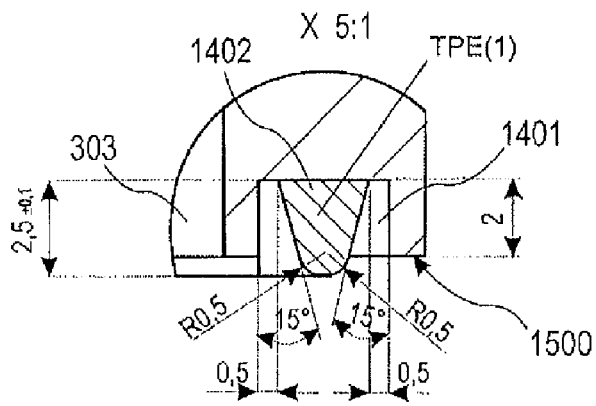
FIG. 15 shows a detailed section view of a sealing lip according to an exemplary embodiment of the present invention.

FIG. 15 shows a detailed section view of a sealing lip according to an exemplary embodiment of the present invention. In this arrangement the housing groove 1401 with the sealing lip 1402 from FIG. 14 is shown in an enlarged view. The underside of the housing 101 is closed off by the lower edge 1500. The sealing lip 1402 is arranged in a triangular shape in the groove 1401 that is formed by the housing wall of the housing 101. The sealing lip 1402 projects beyond the lower edge 1500 of the housing 101. When the lower edge 1500 is placed on the base 100 the housing underside 1500 comes to rest flat against the base surface 100. Since the sealing lip 1402 is made from an elastic material, due to the pressure from the base plate, the sealing lip can be pushed back into the groove 1401. However, in this arrangement the sealing lip does not rest flat against the base surface 100.

As a result of the sealing lip 1402 resting flat against the base plate 100 a seal is created which prevents dirt particles from being able to enter the housing volume 303, between the housing 101 and the base plate 100. By means of this seal, it is also possible to keep splash water away from the interior of the housing.

By attaching the sealing lip 1402 in the groove 1401 and thus in the housing 101, the sealing lip is connected to the housing 101 so as to be captive. As a result of this, installation on the base plate 100 may be facilitated.

Figure 16:
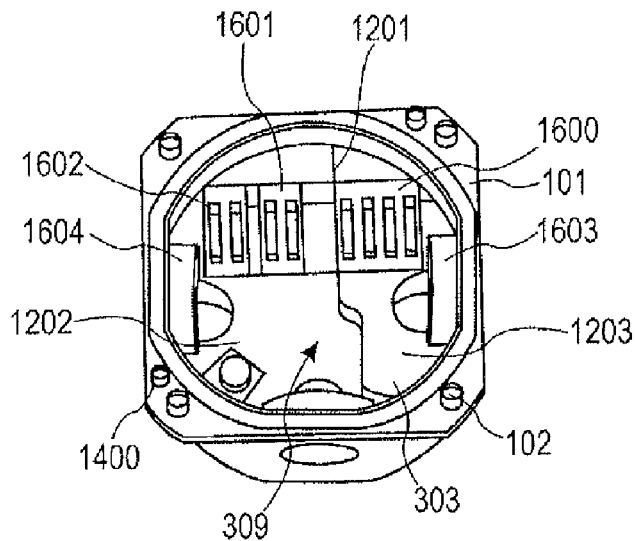
FIG. 16 shows a bottom view of an open housing module according to an exemplary embodiment of the present invention.

FIG. 16 shows a bottom view of a housing module according to an exemplary embodiment of the present invention. The housing module 101 with the guide journals 1400 and the hexagon socket screws 102 is shown. In the interior of the volume 303 there is an insert 309. The barrier 1201 of the insert 309 separates an explosion-proof region 1202 from a housing region or volume region 1203 that is not explosion proof.

The contact strip 1600 can for example lead to digital inputs that do not have to meet any explosion protection requirements. However, the contact strip 1601 and 1602 can lead to sensor inputs, for example HART® inputs or 4 . . . 20 mA inputs. Explosion protection requirements may exist in relation to such sensor inputs. In this arrangement the barrier 1201 prevents lines that are fed through the lead-through 1603 into the region that is not explosion proof from establishing contact with connections which are fed into the explosion-proof region by way of access 1604. In this way an explosion-proof protection housing may be provided.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

What is claimed is:

1. A modular protection housing for a field device, comprising:
   a first housing module having a first volume and a first potential rail; and
   a second housing module having a second volume and a second potential rail;
   wherein the first housing module and the second housing module are coupled so as, in a coupled operating state, to form a uniform housing with a shared volume, the shared volume being composed from the first volume and the second volume;
   wherein the first potential rail and the second potential rail are coupled in such a way that the first potential rail and the second potential rail, in the coupled operating state, form a common potential rail extending through the shared volume,
   wherein the first potential rail and the second potential rail are coupled so that the common potential rail comprises a cylindrical housing extension,
   wherein the first housing module and the second housing module are rotatably coupled to each other,
   wherein in the coupled operating state, the cylindrical housing extension serves as a rotary bearing for the protection housing, and
   wherein the common potential rail is made of electrically conductive material.

2. The modular protection housing according to claim 1, wherein at least one of the first and second housing modules includes a receptacle for an electronic circuit.

3. The modular protection housing according to claim 1, wherein at least one potential rail is made from the group comprising the first potential rail, the second potential rail and the common potential rail as an electromagnetic compatibility protection device.

4. The modular protection housing according to claim 1, wherein at least one potential rail is made from the group consisting of the first potential rail, the second potential rail and the common potential rail as a potential equalisation device.

5. The modular protection housing according to claim 1, wherein a part of at least one of the housing modules is made from a conductive material.

6. The modular protection housing according to claim 1, wherein at least one of the housing modules is (i) selected from the group consisting of the first housing module and the second housing module and (ii) includes a plug-in insert; and wherein the plug-in insert separates an intrinsically safe region of the housing module volume from a region of the housing module volume that is not intrinsically safe.

7. The modular protection housing according to claim 1, wherein at least one housing module is (i) selected from the group consisting of the first housing module and the second housing module and (ii) includes an external opening.

8. The modular protection housing according to claim 1, wherein a cable is inserted in the external opening.

9. The modular protection housing according to claim 1 wherein the external opening is utilized for a connection to the potential rail.

10. The modular protection housing according to claim 1, wherein at least one housing module is (i) selected from the group consisting of the first housing module and the second housing module and (ii) includes a closing cover, the closing cover being detachable from the housing module; and wherein, in an operating state in which the cover is detached, the volume of the housing module is accessible.

11. The modular protection housing according to claim 2, wherein a part of the receptacle establishes an electrical contact with at least one of the first and second potential rails.

12. The modular protection housing according to claim 6, wherein the plug-in insert includes a captive attachment device.

13. The modular protection housing according to claim 10, wherein a seal is situated between the housing module and the closing cover.

14. The modular protection housing according to claim 12, wherein the captive attachment device is a screw.

15. The modular protection housing according to claim 13, wherein the seal is captive.

16. A field device, comprising:
   a modular protection housing including (i) a first housing module having a first volume and a first potential rail; and (ii) a second housing module having a second volume and a second potential rail,
   wherein the first housing module and the second housing module are coupled so as, in a coupled operating state, to form a uniform housing with a shared volume, the shared volume being composed from the first volume and the second volume;
   wherein the first potential rail and the second potential rail are coupled in such a way that the first potential rail and the second potential rail, in the coupled operating state, form a common potential rail extending through the shared volume;

wherein the first potential rail and the second potential rail are coupled so that the common potential rail comprises a cylindrical housing extension, wherein the first housing module and the second housing module are rotatably coupled to each other, wherein in the coupled operating state, the cylindrical housing extension serves as a rotary bearing for the protection housing, and wherein the common potential rail is made of electrically conductive material.

* * * * *